United States Patent [19]

Schneider et al.

[11] Patent Number: 5,134,346
[45] Date of Patent: Jul. 28, 1992

[54] APPARATUS FOR DRIVING A SPINDLE OF AN ELECTROEROSIVE MACHINE

[75] Inventors: Rudolf Schneider; Niklaus Liechti, both of Reinach, Switzerland

[73] Assignee: Erowa AG, Reinach, Switzerland

[21] Appl. No.: 404,319

[22] Filed: Sep. 7, 1989

Related U.S. Application Data

[63] Continuation-in-part of Ser. No. 172,710, Mar. 24, 1988, abandoned.

[30] Foreign Application Priority Data

Apr. 8, 1987 [DE] Fed. Rep. of Germany ....... 3711819

[51] Int. Cl.$^5$ ............................................. H02K 7/116
[52] U.S. Cl. ......................................... 318/8; 318/13; 318/15; 318/55
[58] Field of Search ................. 318/6, 7, 8, 9, 11, 318/12, 13, 14, 15, 40, 45, 46, 48, 51, 52, 53, 55, 66, 67, 68, 69, 70, 76, 111, 112

[56] References Cited

U.S. PATENT DOCUMENTS

| | | | |
|---|---|---|---|
| 3,202,893 | 8/1965 | Arp et al. | 318/13 |
| 3,434,025 | 3/1969 | Parkinson et al. | 318/8 |
| 3,452,261 | 6/1969 | Tagliasacchi | 318/77 |
| 3,559,008 | 1/1971 | Stut et al. | 318/8 |
| 3,612,965 | 10/1971 | France | 318/7 |
| 4,087,731 | 5/1978 | Rhoades | 318/625 |
| 4,594,652 | 6/1986 | Mattson | 318/49 X |
| 4,712,048 | 12/1987 | Rebsamen | 318/85 |
| 4,788,606 | 11/1988 | Uchikoshi | 318/7 X |

Primary Examiner—Bentsu Ro
Attorney, Agent, or Firm—Tarolli, Sundheim & Covell

[57] ABSTRACT

The driving apparatus for the rotation of the spindle or the work piece pallet of an electroerosive machining device comprises two electric motors which drive e.g. the spindle to a rotational movement by means of two gear boxes and a plurality of gear wheels. In order to avoid any backlash in the gear box and any clearance between the gear wheels and to compensate the elasticity of the gear transmission, the two electric motors are always operated to rotate in opposite directions and/or to yield different values of torque. Thus, the entire transmission assembly is always subjected to a certain bias force so that a precise positioning of the spindle is possible by means of simple and inexpensive driving elements.

8 Claims, 4 Drawing Sheets

001# APPARATUS FOR DRIVING A SPINDLE OF AN ELECTROEROSIVE MACHINE

This application is a continuation-in-part of application Ser. No. 07/172,710, filed Mar. 24, 1988, now abandoned.

BACKGROUND OF THE INVENTION

1. Field of the Invention

The present invention relates to a driving apparatus for driving the spindle or the workpiece pallet of an electroerosive machining apparatus to a rotational movement.

It is well known in the art that an electroerosive machining apparatus ensures an extremely precise machining of workpieces by removing workpiece material under the effect of electro erosion. In order to achieve an accurate shaping of a workpiece, the parts and elements of the electroerosive machining apparatus have to be manufactured and must operate with at least an equal precision, if possible with an even higher degree of precision than the desired accuracy of shaping of the workpiece.

In the case of e.g. a spark erosion machining apparatus, an electrode is used to machine the workpiece, said electrode being received in a spindle of the apparatus and can be raised and lowered as well as rotated. A driving means is provided to rotate the spindle and thereby the electrode, said driving means usually comprising an electric motor. In order to displace the electrode into a desired angular orientation, the spindle is rotated by the electric motor via a reduction gearbox.

2. Prior Art

One of the main problems in connection with known driving devices of the kind referred to hereinabove is the transmission backlash between motor shaft, gear box and spindle. Thus, one was forced to use extremely precisely manufactured reduction gear boxes and power transmission elements in order to achieve the desired high positional accuracy of the angular position of the spindle. Such a driving apparatus, however, is very expensive, requires a frequent maintenance and is subject to wear out comparatively quickly; thus, the precision to be achieved is impaired. The same facts are true for a driving apparatus for the rotation of workpiece pallets.

OBJECTS OF THE INVENTION

It is an object of the invention to provide a driving apparatus of the kind referred to hereinabove which avoids the disadvantages discussed hereinbefore. Particularly, it is an object of the invention to provide a driving apparatus which can be manufactured with low expense and which offers a reliable operation during an extended period of time with a high degree of precision.

It is a still further object of the invention to provide a driving apparatus which renders possible a still increased degree of positional precision with respect to the angle of rotation of the spindle or the workpiece pallet, and which allows a quick rotation of the spindle or the workpiece pallet accurately into a desired angular position.

SUMMARY OF THE INVENTION

The present invention provides a driving apparatus for driving the spindle or the workpiece pallet of an electroerosive machining device. The apparatus comprises at least two electric motors adapted to be operated to rotate in either rotating direction. Reduction gear means are associated with each of said electric motors each including an input member operatively connected to the associated electric motor and driven by said electric motor as well as an output member operatively connected to and driving the spindle or the workpiece pallet of the electroerosive machining device.

Further, the apparatus comprises a plurality of revolution sensing means each associated with one of said electric motors and operatively connected thereto.

Finally, there is provided a control means operatively connected to said at least two electric motors as well as to said revolution sensing means. The control means operates at least two of said electric motors to rotate in opposite directions and/or to yield different values of torque in any operating condition of the driving apparatus.

Thus, the entire transmission assembly, i.e. the reduction gear box as well as the associated transmission elements, are maintained always under a certain bias torque which renders every backlash in the gear box and any clearance between the gear wheels ineffective and compensates the elasticity which is always present in a mechanical transmission system. The main advantage is that the reduction gear box and the transmission elements can be of much simpler design and therefore are less expensive. Even if the transmission backlash should increase after a long period of operation, e.g. due to wear, this effect has no influence on the positional precision.

In most cases, two electric motors are provided; however, depending on the individual situation, more than two electric motors may be used.

The expression ". . . to rotate in opposite directions and/or to yield different values of torque . . ." has to be interpreted as follows, depending on the operating conditions of the apparatus:

1. If the spindle or the workpiece pallet is in its stopped condition, both electric motors are operated to yield the same value of torque, but to rotate in opposite directions.
2. If the spindle or the workpiece pallet is driven to a first, lower rotational speed, the two electric motors rotate in opposite senses and are operated to yield different values of torque.
3. If the spindle or the workpiece pallet is driven to a second, higher rotational speed, the two electric motors rotate in the same sense but are operated to yield different values of torque.

This means that the two electric motors never act identically on the spindle or the workpiece pallet, but always generate a certain bias torque in the transmission assembly.

Preferably, the two electric motors are operated to rotate in opposite directions and to yield the same value of torque when the spindle or the workpiece pallet is in a stopped condition. Thereby, it may be achieved that no undefined state can occur in the transmission assembly in the moment when the spindle or the workpiece pallet starts its rotational movement, because one of the electric motors always yields a certain torque in a first direction at standstill as well as during the rotation of the spindle or the workpiece pallet, while the other electric motor yields a higher torque than the said one electric motor in the moment of start and, thus, rotates the spindle or the workpiece pallet.

According to a further embodiment of the apparatus of the invention, during the transistion from the stopped condition of the spindle or the workpiece pallet to said second, higher speed of rotation, one of said electric motors continues to rotate in the same direction of rotation and is operated to yield a higher value of torque, while the direction of rotation of said other electric motor is reversed with a predetermined time lag. Also this characteristic, which is not absolutely necessary due to the inertia of the transmission assembly, helps to avoid that no undefined or unloaded state can occur in the transmission assembly.

BRIEF DESCRIPTION OF THE DRAWINGS

In the following, a preferred embodiment of the driving apparatus of the invention will be described in detail, with reference to the attached drawings.

FIG. 3 is a diagram for the illustration of the operation of the driving apparatus according to the invention;

FIGS. 4a+4b are extracts of a diagram similar to the one shown in FIG. 3; and

Figure 1:
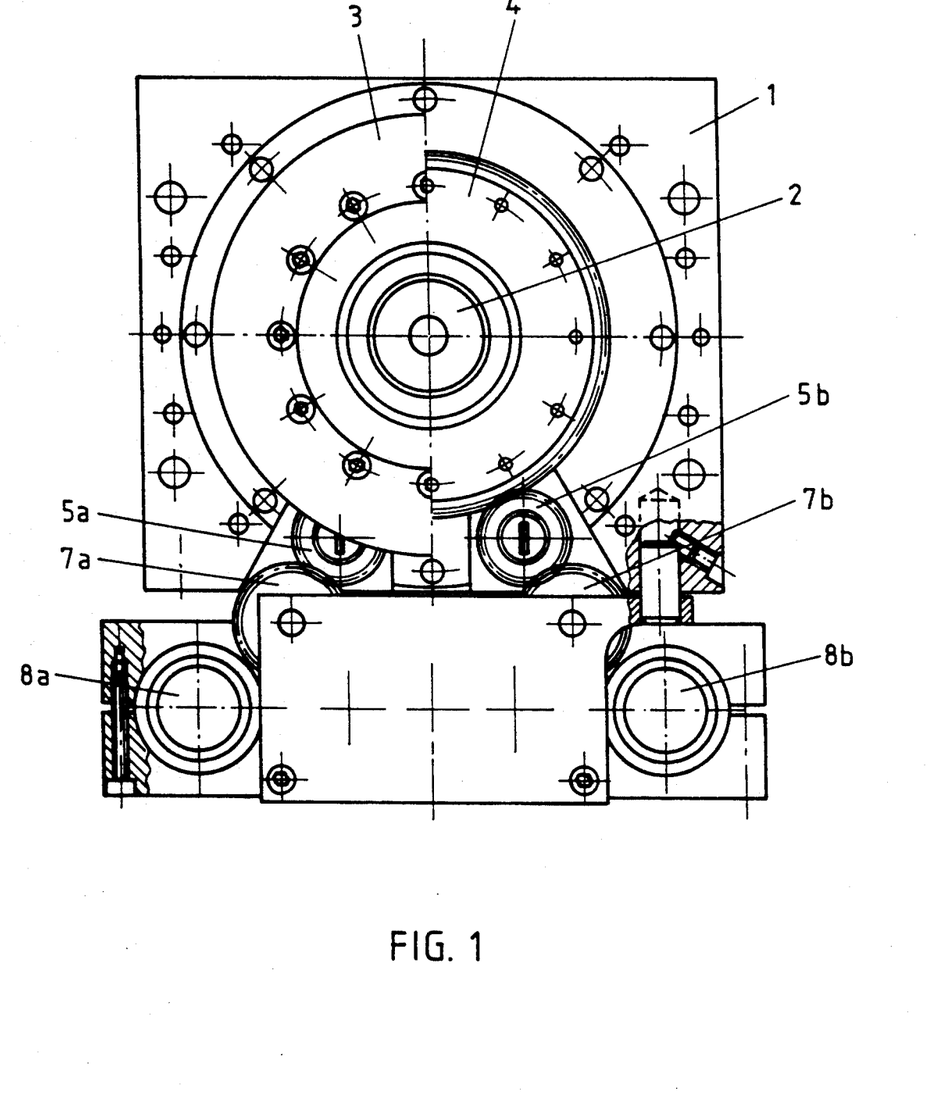
FIG. 1 is a partially sectioned top view of a driving apparatus for the rotation of the spindle of an electroerosive machining device.
Figure 2:
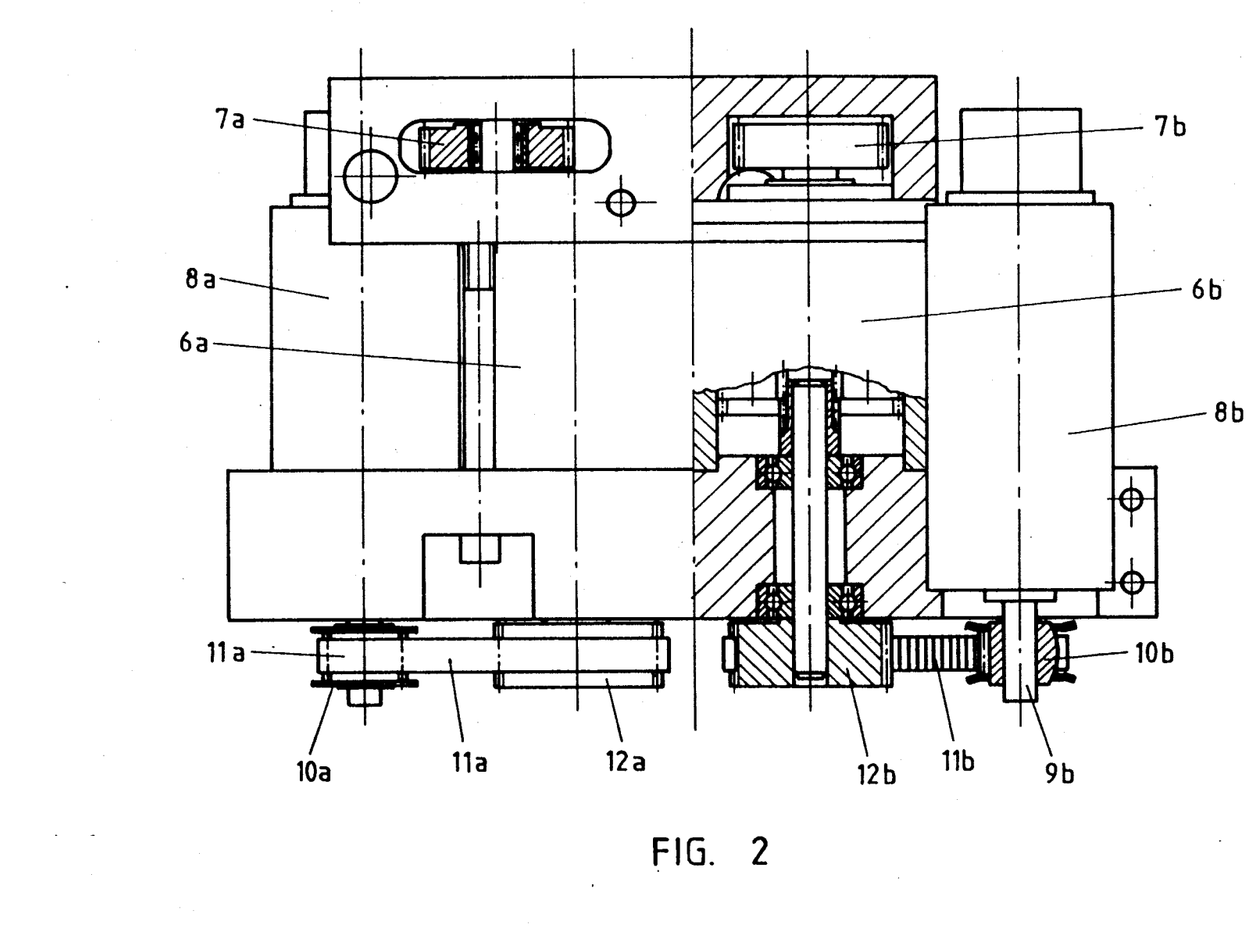
FIG. 2 is a partially sectioned side view of the apparatus shown in FIG. 1.

As can be seen in FIGS. 1 and 2, the driving apparatus comprises a bearing housing 1 which receives a spindle 2 of an electroerosive machining device. The spindle 2 is rotatably mounted in the bearing housing 1 by means of not shown bearing elements known per se in the art. A revolution sensor 3 is arranged above the spindle 2 in coaxial relationship and torsionally fixedly connected to the spindle 2. The sensor 3 serves to monitor the angular position of the spindle 2 and is operatively connected to a control unit as will be explained in more detail in connection with FIG. 5.

The spindle 2 is provided with a gear wheel 4 serving to drive the spindle 2 to a rotational movement. Two intermediate gear wheels 5a and 5b mesh with the gear wheel 4 as well as with two gear wheels 7a and 7b which are the output members of two reduction gear boxes 6a and 6b. Two electric motors 8a and 8b located in the vicinity of the gear boxes 6a and 6b each bear a pulley 10a and 10b fixed to their respective output shafts 9a and 9b. The pulleys 10a and 10b are operatively connected, by means of toothed belts 11a and 11b, to further pulleys 12a and 12b serving as input members of the gear boxes 6a and 6b.

It is quite evident for every person skilled in the art that such or a similar gear transmission has a certain elasticity which cannot be neglected, and further that a certain backlash is present in the gear boxes 6a and 6b as well as a clearance between the meshing gear wheels 4, 5a, 7a and 4, 5b, 7b, respectively. Such backlash and clearance are very difficult to minimize by constructional measures; anyway, this would require expensive measures.

According to the present invention, these disadvantages are avoided by operating the two electric motors 8a and 8b never equally. With other words, the spindle 2 being in its stopped condition, the electric motor 8a is operated to rotate in e.g. clockwise direction and the other electric motor 8b in counter-clockwise direction; however, the control unit operates the two electric motors such that they yield the same amount of torque which is transferred to the driving gear mechanism and thereby to the gear wheel 4 of the spindle 2. Thus, the driving gear mechanism is subjected to a certain bias with the effect that all backlash and clearance is removed and the elasticity is compensated. If it is intended to rotate the spindle 2 slowly, e.g. into a nearby located angular position, one of the two electric motors, depending on the desired sense of rotation e.g. the electric motor 8a, is operated such that it yields a higher torque while the operating conditions of the other electric motor 8b remain unchanged. If the spindle 2 has to be rotated quickly into a distantly located angular position, one of the electric motors, depending on the desired sense of rotation e.g. the electric motor 8a, is operated such that it yields a higher torque while the sense of rotation of the other electric motor 8b is reversed and the latter is operated to yield a lower torque than the electric motor 8a.

Figures 3, 4A, 4B:
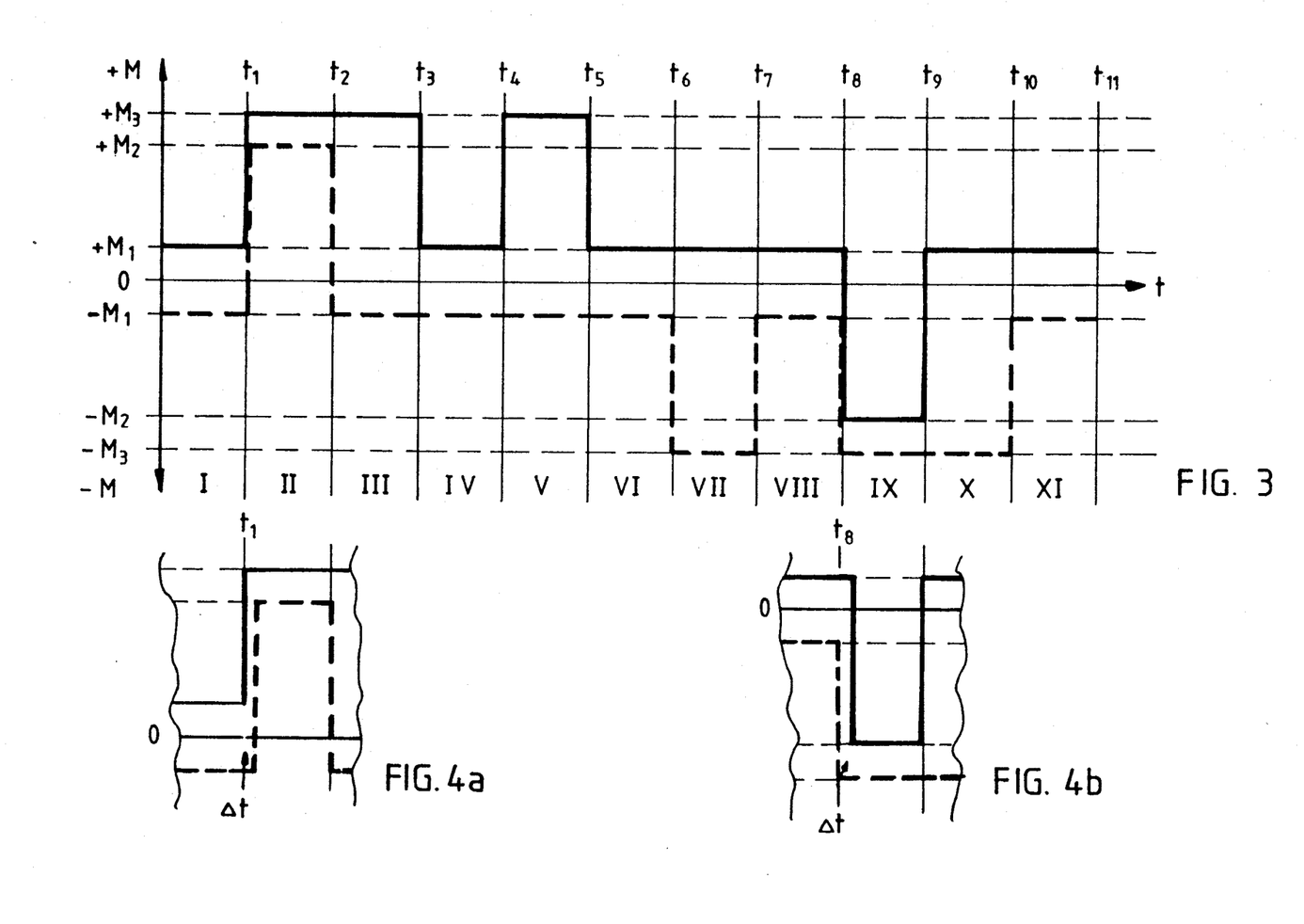

The diagram of FIG. 3 shows these operating conditions in a simplified illustration. The solid line refers to the electric motor 8a and the dashed line refers to the electric motor 8b.

The spindle 2 is in its stopped condition during the time interval $t_0$ to $t_1$ because the electric motor 8a yields a positive torque $+M_1$ and the electric motor 8b yields a negative torque $-M_1$; the absolute values of the two torques are identical but have opposite direction. At the time $t_1$ the spindle 2 has to be rotated into a comparatively distantly located angular position. For this purpose, the motor 8a is operated such that the torque it yields increases from the value $+M_1$ to the value $+M_3$. Simultaneously, the sense of rotation of the motor 8b is reversed and it is operated to yield a torque with a value of $+M_2$. The value $+M_2$ is less than the value $+M_3$; consequently the bias in the gear transmission is maintained.

It is supposed that an angular position quite near to the desired angular position is reached at the time $t_2$. Now, the sense of rotation of the motor 8b is reversed at the time $t_2$ and it yields, exactly as during the the stopped condition, a torque with the value $-M_1$ again. Thus, it operates in increased manner as a brake for the motor 8a and thereby increases the bias in the gear transmission. As soon as the desired angular position is reached, i.e. at the time $t_3$, the motor 8a is operated to yield a torque with a value $+M_1$, with the consequence that the spindle 2 is in its stopped condition during the time interval from $t_3$ to $t_4$. The operating conditions of the motor 8b, however, remained unchanged even at the time $t_3$; it is operated further to yield a negative torque with a value of $-M_1$.

It is further supposed that, subsequently, the spindle 2 has to be rotated in the same sense of rotation into a nearby located angular position at the time $t_4$. For this purpose, the motor 8a is operated to yield a higher torque with the value $+M_3$ while the operating conditions of the motor 8b remain unchanged. At the time $t_5$, as soon as the desired new angular position is reached, the motor 8a is operated to yield the former torque with the value $+M_1$ again; this means that the torques yielded by the two motors 8a and 8b compensate each other and the spindle 2 stops. At the time $t_6$ the spindle has to be rotated back into its former nearby angular position. For this purpose, the motor 8b is operated such that the torque yielded by this motor increases from the value $-M_1$ to the value $-M_3$ while the operating conditions of the motor 8a remain unchanged, i.e. it yields a torque with a value $+M_1$. Consequently, the spindle 2 rotates in the opposite direction under the influence of the motor 8b.

At the time $t_7$ the new position is reached and the motor 8b is operated such that the amount of torque yielded by it decreases to the value $-M_1$ so that the spindle will be in its stopped condition at the time $t_8$. Thereafter, a greater rotation of the spindle in the minus-direction should take place. For this purpose, simultaneously, the motor 8b is operated to yield an increased torque with the value $-M_3$ and the sense of rotation of the motor 8a is reversed and it is operated to yield a torque with a value $-M_2$ which is less than the torque with the value $-M_3$ yielded by the motor 8b. Thus, the motor 8a operates as a weak brake an maintains the bias in the gear transmission. When the new desired angular position is nearly reached, i.e. at the time $t_9$, the sense of the rotation of the motor 8a is reversed and it is operated to yield a torque with a value $+M_1$; thereby the motor 8b is retarded to a greater extent. At the time $t_{10}$ the new desired angular position is reached and the motor 8b is operated to yield a torque with the lower value $-M_1$ while the motor 8a still yields a positive torque with the value $+M_1$. Consequently, the spindle 2 is in its stopped condition up to the time $t_{11}$.

It can be clearly understood from the above explanations that the two motors 8a and 8b act always in different senses on the gear transmission assembly comprising the transmission belts 11a, 11b, the gear boxes 6a, 6b, the gear wheels 5a, 5b and 7a, 7b and the gear wheel 4 and thereby constantly create a bias force in the entire transmission assembly. Even if this bias force is somewhat lower if the spindle is quickly rotated, it is anyway sufficient since the precision requirements are not extremely high during this high speed rotation.

A critical moment could occur under certain circumstances at the times $t_1$ and $t_8$, i.e. when, simultaneously, the sense of rotation of one motor is reversed and the torque yielded by the other motor is increased. If the moment of inertia of the gear transmission should be insufficient to provide sufficient damping, the invention provides according to a further embodiment that reversing of the sense of rotation of the one motor and the increase of torque yielded by the other motor, respectively, is not effected exactly simultaneously but with a certain time lag.

As can be seen from FIG. 4a, the motor 8a is operated to yield a higher torque exactly at the time $t_1$ and the sense of rotation as well as the increase of the torque to the value $+M_2$ of the motor 8b is effected with a small time lag $\Delta t$. Thus, it is ensured that the sense of rotation of the motor 8b takes place only when the motor 8a yields its predetermined torque and thus maintains the bias in the gear transmission during the start of the motor 8a. The situation shown in FIG. 4b is similar at the time $t_8$: The sense of rotation of the motor 8a is reversed only after a certain time lag $\Delta t$, i.e. as soon as the motor 8b yields the required torque with a value $-M_3$.

The absolute values of and the relations between the torques $M_1$, $M_2$ and $M_3$ of course depend of the individual operating conditions of the driving apparatus. As a guide, the following figures can be given: The value of $M_1$ is from about 15% to about 40%, preferably about 20% of the value of $M_3$, and the value of $M_2$ is from about 60% to about 85%, preferably about 80% of the value of $M_3$.

Figure 5:
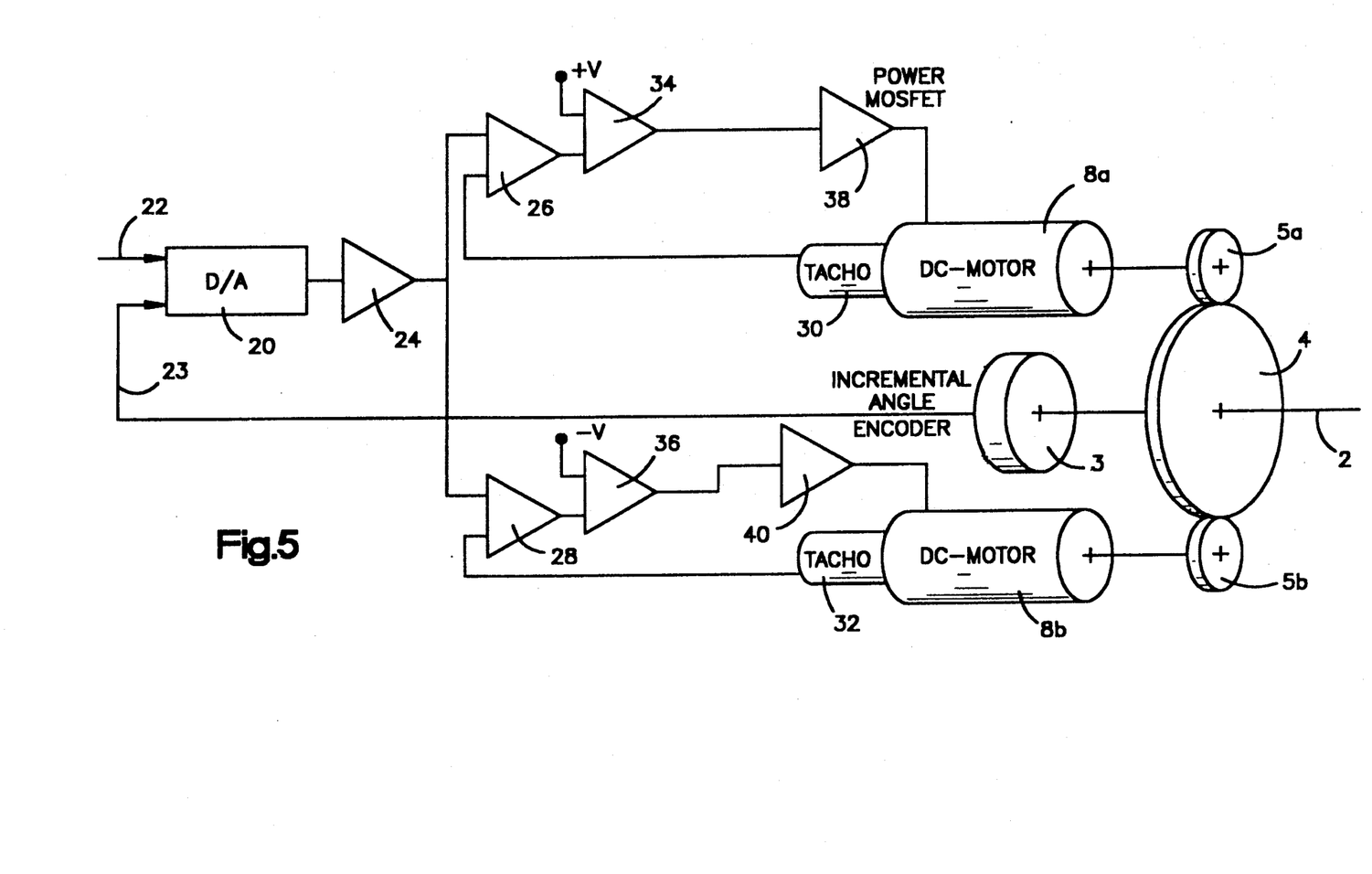
FIG. 5 is a function diagram of the driving apparatus of the invention showing the most important parts of the control and power supply means.

In FIG. 5, a function diagram of the apparatus of the invention is shown. For simplicity's sake, the reduction gearboxes 6a and 6b as well as the transmission means 10a, 11a, 12a and 10b, 11b, 12b, respectively, are not shown in full detail. However, the spindle 2, the gear wheel 4 connected to the spindle 2, the revolution sensor 3 coupled to the spindle 2 and the two electric motors 8a and 8b with associated gear wheels 5a and 5b can be seen.

The control unit of the apparatus comprises a digital/analog converter 20 having a first input 22 connected to the output of a conventional NC-control apparatus known in the art and not shown in the drawing. The second input of the digital/analog converter is connected to the output of the revolution sensor 3. The output of the digital/analog converter 20 is connected to the input of a buffer amplifier 24 whose output is connected to the first input of a first differential amplifier 26 and to the first input of a second differential amplifier 28. Each electric motor 8a and 8b, respectively, is provided with a tacho generator 30 and 32, respectively. The output of the tacho generator 30 is connected to the second input of the first differential amplifier 26, and the output of the tacho generator 32 is connected to the second input of the second differential amplifier 28.

Further, a third differential amplifier 34 and a fourth differential amplifier 36 are provided. While the output of the first differential amplifier 26 is connected to the first input of the third differential amplifier 34, its second input is biased with a preset positive voltage $+V$. Correspondingly, the output of the second differential amplifier 28 is connected to the first input of the fourth differential amplifier 36, while its second input is biased with a preset negative voltage $-V$. The output signal of the third differential amplifier 34 is fed, via a first power amplifier 38, to the electric motor 8a, and the output signal of the fourth differential amplifier 36 is fed, via a second power amplifier 40, to the electric motor 8b.

In a first operating condition, the spindle 2 is in rest. Thus, no input signal reaches the input 22 of the digital/analog converter 20 and, consequently, the output signal thereof is zero. The output of the buffer amplifier 24 also yields a zero signal to the first inputs of the first and second differential amplifiers 26 and 28, respectively. The second inputs of the first and second differential amplifiers 26 and 28, respectively, are also at zero level since the tacho generators 30 and 32 coupled to the electric motors 8a and 8b which are not rotating do not yield an output signal. Since the first and second inputs of the first differential amplifier 26 have the same level, no output signal is generated. The output of the first differential amplifier 26 being connected to the first input of the third differential amplifier 34 and having zero level and the second input of the third differential amplifier 34 being tied to a voltage of $+V$, the output signal of the third differential amplifier 34 is positive. This positive output signal is amplified by the first power amplifier 38 and attempts to drive the electric motor 8a to a positive rotational movement.

Simultaneously, since the first and second inputs of the second differential amplifier 28 have the same level, no output signal is generated. The output of the second differential amplifier 28 being connected to the first input of the fourth differential amplifier 36 and having zero level and the second input of the fourth differential amplifier 36 being tied to a voltage of $-V$, the output signal of the fourth differential amplifier 36 is negative.

This negative output signal is amplified by the second power amplifier 40 and attempts to drive the electric motor 8b to a negative rotational movement.

It may be easily understood that the spindle 2 will not rotate because the electric motors 8a and 8b are driven in opposite senses of rotation with the same value of driving signal, and that the transmission and gear box parts are biased thereby removing any backlash.

In a second operating condition, the spindle 2 has to be driven to a rotational movement with a first, lower speed in a negative sense of rotation. For this purpose, an appropriate pulse train is generated in the NC-control of the machining apparatus and fed via the input 22 to the digital/analog converter 20. The latter one creates a continuous analog positive output signal $+V_1$ which is delivered via the buffer amplifier 24 to the first input of the differential amplifier 26. The absolute value of the voltage of $+V_1$ is less than the absolute value of the voltage $+V$.

In an initial phase, the output signal of the tacho generator 30 is zero and then slowly increasing as soon as the electric motor 8a starts to rotate. In the moment when the positive signal $+V_1$ arrives at the first input of the first differential amplifier 26, its second input connected to the output of the tacho generator 30 is still zero with the result, that a positive output signal appears at the output of the first differential amplifier 26. Thus, a positive signal is fed to the first input of the third differential amplifier 34 which is less in value than the signal $+V$ connected to the second input of the third differential amplifier 34. The consequence is that a positive signal appears at the output of the third differential amplifier 34 which is fed via the power amplifier 38 to the electric motor 8a and which attempts to drive the electric motor 8a in a positive sense of rotation.

Simultaneously, the positive output signal of the buffer amplifier 24 is fed to the first input of the second differential amplifier 28. Since the second input of the second differential amplifier 28 is tied to the output of the tacho generator 32 which still does not rotate, the second input of the second differential amplifier is at zero level and a positive output signal appears at the output of the second differential amplifier 28. This output signal is fed to the first input of the fourth differential amplifier 36. As the second input thereof is tied to $-V$ with an absolute value considerable higher than the positive signal appearing at the first input of the fourth differential amplifier 36, a high negative output signal will appear at the output of the fourth differential amplifier 36. This output signal is fed via power amplifier 40 to the electric motor 8b and attempts to drive it in a negative sense of rotation.

As the value of the negative output signal of the power amplifier 40 is higher than the value of the positive output signal of the power amplifier 38, and as the two electric motors 8a and 8b are positively coupled to each other via gear wheels 4, 5a and 5b, the spindle will be rotated in a negative sense because the electric motor 8b yields a negative torque with an absolute value which is higher than the absolute value of positive torque yielded by the electric motor 8a.

Up to now, we have supposed that the outputs of the tacho generators 30 and 32 and, consequently, the second inputs of the first and second differential amplifiers 26 and 28 are at zero level. However, we have shown that the two electric motors 8a and 8b and thereby the two tacho generators 30 and 32 will rotate in a negative sense. Thus, the tacho generators 30 and 32 will yield a negative signal which preferably is limited to a selected value.

The presence of the negative tacho generator output signal at the second input of the first differential amplifier 26 causes that the positive output signal thereof somewhat increases. Thereby, the difference between this positive output signal and $+V$ decreases such that the output signal of the third differential amplifier also decreases. Thus, the electric motor 8a yields a smaller positive torque. Correspondingly, the presence of the negative tacho generator output signal at the second input of the second differential amplifier 28 causes that the positive output signal thereof somewhat increases. Thereby, the difference between this positive output signal and $-V$ decreases such that the output signal of the fourth differential amplifier also decreases. After a short time, the operating conditions are stabilized and the spindle 2 will rotate in negative sense with said first lower speed.

In a third operating condition, the spindle 2 has to be driven to a rotational movement with a second, higher speed in a negative sense of rotation. For this purpose, an appropriate pulse train is generated in the NC-control of the machining apparatus and fed via the input 22 to the digital/analog converter 20. The latter one creates a continuous analog positive output signal $+V_2$ which is delivered via the buffer amplifier 24 to the first input of the differential amplifier 26. The absolute value of the voltage of $+V_2$ is higher than the absolute value of the voltage $+V$.

In an initial phase, the output signal of the tacho generator 30 is zero and then slowly increasing as soon as the electric motor 8a starts to rotate. In the moment when the positive signal $+V_2$ arrives at the first input of the first differential amplifier 26, its second input connected to the output of the tacho generator 30 is still zero with the result, that a positive output signal appears at the output of the first differential amplifier 26. Thus, a positive signal is fed to the first input of the third differential amplifier 34 which is higher in value than the signal $+V$ connected to the second input of the third differential amplifier 34. The consequence is that a small negative signal appears at the output of the third differential amplifier 34 which is fed via the power amplifier 38 to the electric motor 8a and which attempts to drive the electric motor 8a in a negative sense of rotation with small torque.

Simultaneously, the positive output signal $+V_2$ of the buffer amplifier 24 is fed to the first input of the second differential amplifier 28. Since the second input of the second differential amplifier 28 is tied to the output of the tacho generator 32 which still does not rotate, the second input of the second differential amplifier is at zero level and a positive output signal appears at the output of the second differential amplifier 28. This output signal is fed to the first input of the fourth differential amplifier 36. As the second input thereof is tied to $-V$ with an absolute value somewhat lower than the positive signal $+V_2$ appearing at the first input of the fourth differential amplifier 36, a very high negative output signal will appear at the output of the fourth differential amplifier 36. This output signal is fed via power amplifier 40 to the electric motor 8b and attempts to drive it in a negative sense of rotation with high torque.

As the value of the negative output signal of the power amplifier 40 is higher than the value of the negative output signal of the power amplifier 38, and as the two electric motors 8a and 8b are positively coupled to each other via gear wheels 4, 5a and 5b, the spindle will be rotated in a negative sense with high speed. However, the gearing and transmission members are still biased because the electric motor 8b yields a negative torque with an absolute value which is higher than the absolute value of negative torque yielded by the electric motor 8a.

Up to now, we have supposed that the outputs of the tacho generators 30 and 32 and, consequently, the second inputs of the first and second differential amplifiers 26 and 28 are at zero level. However, we have shown that the two electric motors 8a and 8b and thereby the two tacho generators 30 and 32 will rotate in a negative sense. Thus, the tacho generators 30 and 32 will yield a negative signal which preferably is limited to a selected value.

The presence of the negative tacho generator output signal at the second input of the first differential amplifier 26 causes that the positive output signal thereof somewhat increases. However, it will be still higher than $+V$. Thereby, the difference between this positive output signal and $+V$ decreases, but remains negative, such that the output signal of the third differential amplifier also decreases. Thus, the electric motor 8a yields a smaller negative torque. Correspondingly, the presence of the negative tacho generator output signal at the second input of the second differential amplifier 28 causes that the positive output signal thereof somewhat increases. Thereby, the difference between this positive output signal and $-V$ decreases such that the output signal of the fourth differential amplifier also decreases. After a short time, the operating conditions are stabilized and the spindle 2 will rotate in negative sense with said second higher speed.

In a fourth operating condition, the spindle 2 has to be driven to a rotational movement with a first, lower speed in a positive sense of rotation. For this purpose, an appropriate pulse train is generated in the NC-control of the machining apparatus and fed via the input 22 to the digital/analog converter 20. The latter one creates a continuous analog negative output signal $-V_1$ which is delivered via the buffer amplifier 24 to the first input of the second differential amplifier 28. The absolute value of the voltage of $-V_1$ is less than the absolute value of the voltage $-V$.

In an initial phase, the output signal of the tacho generator 32 is zero and then slowly increasing as soon as the electric motor 8a starts to rotate. In the moment when the negative signal $-V_1$ arrives at the first input of the second differential amplifier 28, its second input connected to the output of the tacho generator 32 is still zero with the result, that a negative output signal appears at the output of the second differential amplifier 28. Thus, a negative signal is fed to the first input of the fourth differential amplifier 36 which is less in value than the signal $-V$ connected to the second input of the third differential amplifier 34. The consequence is that a negative signal appears at the output of the fourth differential amplifier 36 which is fed via the power amplifier 40 to the electric motor 8b and which attempts to drive the electric motor 8b in a negative sense of rotation.

Simultaneously, the negative output signal of the buffer amplifier 24 is fed to the first input of the first differential amplifier 26. Since the second input of the first differential amplifier 26 is tied to the output of the tacho generator 30 which still does not rotate, the second input of the first differential amplifier is at zero level and a negative output signal appears at the output of the first differential amplifier 26. This output signal is fed to the first input of the third differential amplifier 34. As the second input thereof is tied to $+V$ with an absolute value considerable higher than the negative signal appearing at the first input of the third differential amplifier 36, a high positive output signal will appear at the output of third differential amplifier 34. This output signal is fed via power amplifier 38 to the electric motor 8a and attempts to drive it in a positive sense of rotation.

As the value of the positive output signal of the power amplifier 38 is higher than the value of the negative output signal of the power amplifier 40, and as the two electric motors 8a and 8b are positively coupled to each other via gear wheels 4, 5a and 5b, the spindle will be rotated in a positive sense because the electric motor 8a yields a positive torque with an absolute value which is higher than the absolute value of negative torque yielded by the electric motor 8b.

Up to now, we have supposed that the outputs of the tacho generators 30 and 32 and, consequently, the second inputs of the first and second differential amplifiers 26 and 28 are at zero level. However, we have shown that the two electric motors 8a and 8b and thereby the two tacho generators 30 and 32 will rotate in a positive sense. Thus, the tacho generators 30 and 32 will yield a positive signal which preferably is limited to a selected value.

The presence of the positive tacho generator output signal at the second input of the first differential amplifier 26 causes that the negative output signal thereof somewhat decreases. Thereby, the difference between this negative output signal and $+V$ decreases such that the output signal of the third differential amplifier also decreases. Thus, the electric motor 8a yields a smaller negative torque. Correspondingly, the presence of the positive tacho generator output signal at the second input of the second differential amplifier 28 causes that the negative output signal thereof somewhat decreases. Thereby, the difference between this negative output signal and $-V$ decreases such that the output signal of the fourth differential amplifier also decreases. After a short time, the operating conditions are stabilized and the spindle 2 will rotate in positive sense with said first lower speed in positive direction of rotation.

In a fifth operating condition, the spindle 2 has to be driven to a rotational movement with a second, higher speed in a positive sense of rotation. For this purpose, an appropriate pulse train is generated in the NC-control of the machining apparatus and fed via the input 22 to the digital/analog converter 20. The latter one creates a continuous analog positive output signal $-V_2$ which is delivered via the buffer amplifier 24 to the first input of the second differential amplifier 28. The absolute value of the voltage of $-V_2$ is higher than the absolute value of the voltage $-V$.

In an initial phase, the output signal of the tacho generator 32 is zero and then slowly increasing as soon as the electric motor 8b starts to rotate. In the moment when the negative signal $-V_2$ arrives at the first input of the second differential amplifier 28, its second input connected to the output of the tacho generator 32 is still zero with the result, that a negative output signal appears at the output of the second differential amplifier 28. Thus, a negative signal is fed to the first input of the fourth differential amplifier 36 which is higher in value than the signal $-V$ connected to the second input of the fourth differential amplifier 36. The consequence is that a small positive signal appears at the output of the fourth differential amplifier 36 which is fed via the power amplifier 40 to the electric motor 8b and which attempts to drive the electric motor 8a in a positive sense of rotation with small torque.

Simultaneously, the negative output signal $-V_2$ of the buffer amplifier 24 is fed to the first input of the first differential amplifier 26. Since the second input of the first differential amplifier 26 is tied to the output of the tacho generator 30 which still does not rotate, the second input of the first differential amplifier is at zero level and a negative output signal appears at the output of the first differential amplifier 26. This output signal is fed to the first input of the third differential amplifier 34. As the second input thereof is tied to $+V$ with an absolute value somewhat lower than the negative signal $-V_2$ appearing at the first input of the third differential amplifier 34, a very high positive output signal will appear at the output of the third differential amplifier 34. This output signal is fed via power amplifier 38 to the electric motor 8a and attempts to drive it in a positive sense of rotation with high torque.

As the value of the positive output signal of the power amplifier 38 is higher than the value of the positive output signal of the power amplifier 40, and as the two electric motors 8a and 8b are positively coupled to each other via gear wheels 4, 5a and 5b, the spindle will be rotated in a positive sense with high speed. However, the gearing and transmission members are still biased because the electric motor 8a yields a positive torque with an absolute value which is higher than the absolute value of positive torque yielded by the electric motor 8b.

Up to now, we have supposed that the outputs of the tacho generators 30 and 32 and, consequently, the second inputs of the first and second differential amplifiers 26 and 28 are at zero level. However, we have shown that the two electric motors 8a and 8b and thereby the two tacho generators 30 and 32 will rotate in a positive sense. Thus, the tacho generators 30 and 32 will yield a positive signal which preferably is limited to a selected value.

The presence of the positive tacho generator output signal at the second input of the first differential amplifier 26 causes that the negative output signal thereof somewhat decreases. However, it will be still higher than $+V$. Thereby, the difference between this negative output signal and $+V$ decreases, but remains negative, such that the output signal of the third differential amplifier also decreases. Thus, the electric motor 8a yields a smaller negative torque. Correspondingly, the presence of the positive tacho generator output signal at the second input of the second differential amplifier 28 causes that the negative output signal thereof somewhat decreases. Thereby, the difference between this negative output signal and $-V$ decreases such that the output signal of the fourth differential amplifier also decreases. After a short time, the operating conditions are stabilized and the spindle 2 will rotate in positive sense with said second higher speed.

It is understood that the control unit schematically shown in FIG. 5 and hereinbefore described represents just one example to control the electric motors 8a and 8b as required by the present invention. It should be apparent to any person skilled in the art that many other designs of control units could be realized which would be in a position to drive the two electric motors in opposite senses of revolutions with the same torque, in opposite senses of revolution with different values of torque and in the same sense of revolution with different values of torque.

The driving apparatus according to the present invention ensures that every backlash in the gear box and every clearance between the gear wheels is eliminated or rendered ineffective and that the elasticity in the entire transmission assembly is compensated. Thus, an extraordinarily high positional accuracy with regard to the rotation angle may be realized which is in the range of 1/1000 angular degrees without the need to use sophisticated, precise and expensive driving and gear elements which are highly subjected to wear. The spindle or the workpiece pallet may be rotated very quickly into a desired angular position and the rotational movement can be stopped immediately without overshoot. The latter is particularly important in the field of spark erosion machining as a spark suddenly appears when the electrode is moved near to the work piece; in this moment, the movement of the electrode must be stopped immediately, but the exact position where this happens cannot be predicted reliably.

What we claimed is:

1. Driving apparatus for driving the spindle or the workpiece pallet of an electroerosive machining device, said driving apparatus comprising:
    at least two electric motors adapted to be operated to rotate in either rotating direction;
    reduction gear means associated with each of said electric motors, each including an input member operatively connected to the associated electric motor and driven by said electric motor as well as an output member operatively connected to and driving the spindle or the workpiece pallet of the electroerosive machining device;
    a plurality of revolution sensing means, each of said plurality of revolution sensing means being associated with each of said electric motors and operatively connected thereto; and
    control means operatively connected to said at least two electric motors as well as to said revolution sensing means, said control means being operable to rotate at least two of said electric motors in opposite directions and to yield different values of torque in a first operating condition, and to rotate said at least two of said electric motors in the same direction and to yield different values of torque in a second operating condition.

2. Driving apparatus for driving the spindle or the workpiece pallet of an electroerosive machining device, said driving apparatus comprising:
    at least two electric motors adapted to be operated to rotate in either rotating direction;
    reduction gear means associated with each of said electric motors, each including an output member operatively connected to the associated electric motor and driven by said electric motor as well as an output member operatively connected to and driving the spindle or the workpiece pallet of the electroerosive machining device;
    a plurality of revolution sensing means, each of said plurality of revolution sensing means being associated with each of said electric motors amd operatively connected thereto; and
    control means operatively connected to said at least two electric motors as well as to said revolution sensing means, said control means being operable to rotate at least two of said electric motors in opposite directions and to yield the same value of torque in a first operating condition, and to rotate said at least two of said electric motors in the same direction and to yield different values of torque in a second operating condition.

3. Driving apparatus acording to claim 1 or 2, in which two electric motors are provided.

4. Driving apparatus according to claim 1, in which two of said electric motors are operated to rotate in opposite directions and to yield different values of torque when the spindle or the workpiece pallet is operated at a first, lower speed.

5. Driving apparatus according to claim 4, in which said two electric motors are operated to rotate in the same direction and to yield different values of torque when the spindle or the workpiece pallet is operated at a second, higher speed.

6. Driving apparatus according to claim 2, in which two of said electric motors are operated to rotate in opposite directions and to yield the same value of torque when the spindle or the workpiece pallet is in a stopped condition.

7. Driving apparatus for driving the spindle or the workpiece pallet of an electroerosive machining device, said driving apparatus comprising:

at least two electric motors adapted to be operated to rotate in either rotating direction;

reduction gear means associated with each of said electric motors each including an input member operatively connected to the associated electric motor and driven by said electric motor as well as an output member operatively connected to and driving said spindle or said workpiece pallet of said electroerosive machining device;

a plurality of revolution sensing means, each of said plurality of revolution sensing means being associated with each of said electric motors and operatively connected thereto; and control means operatively connected to said at least two electric motors as well as to said revolution sensing means, said control means being operable to rotate at least two of said electric motors in the same direction and to yield the same value of torque, both when the spindle or the workpiece pallet is in its stopped condition and when it is operated at a first, lower speed, and to rotate said at least two of said electric motors in the opposite direction and to yield a different value of torque when the spindle or the workpiece pallet is operated at a second, higher speed.

8. Driving apparatus for driving the spindle or the workpiece pallet of an electroerosive machining device, said driving apparatus comprising:

at least two electric motors adapted to be operated to rotate in either rotating direction;

reduction gear means associated with each of said electric motors, each including an input member operatively connected to the associated electric motor and driven by said electric motor as well as an output member operatively connected to and driving said spindle or said workpiece pallet of said electroerosive machining device;

a plurality of revolution sensing means, each of said a plurality of revolution sensing means being associated with each of said electric motors and operatively connected thereto; and control means operatively connected to said at least two electric motors as well as to said revolution sensing means, said control means being operable to operate one of said electric motors to continue to rotate in the same direction of rotation and to yield a higher value of torque than another one of said electric motors, while the direction of rotation of said another one electric motor is reversed with a predetermined time lag during the transition from a stopped condition of the spindle or the workpiece pallet to a higher speed.

* * * * *

UNITED STATES PATENT AND TRADEMARK OFFICE
CERTIFICATE OF CORRECTION

PATENT NO. : 5,134,346
DATED : July 28, 1992
INVENTOR(S) : Rudolf Schneider and Niklaus Liechti It is certified that error appears in the above-identified patent and that said Letters Patent is hereby corrected as shown below:

Column 14, Line 25, Claim 8, delete "a" (second occurrence).

Signed and Sealed this

Twelfth Day of October, 1993

Attest:

BRUCE LEHMAN

Attesting Officer　　Commissioner of Patents and Trademarks